United States Patent Office 3,549,604
Patented Dec. 22, 1970

3,549,604
POLY-m- AND p-CARBORANYLENESULFIDES
Nick S. Semenuk, New Haven, and Hansjuergen A. Schroeder, Hamden, Conn., assignors to Olin Corporation, a corporation of Virginia
No Drawing. Filed July 22, 1968, Ser. No. 746,296
Int. Cl. C08g 23/00
U.S. Cl. 260—79.1     13 Claims

ABSTRACT OF THE DISCLOSURE

Polycarboranylenesulfides are prepared, for example by reacting 1,12-bis(halosulfenyl)-p-carborane with the dilithio salt of p-carborane in an inert solvent. Both m- and p-carboranylenesulfides can be prepared in this manner. The polycarboranylenesulfides of this invention consist essentially of recurring units of the Formula I:

$$\{M-S\}$$

where M represents the meta carboranylene or para carboranylene radical, or of the Formula II:

$$\{M-S-M'-S\}$$

where M and M' are each independently selected from the group consisting of the meta carboranylene or para carboranylene radical and with the proviso that each recurring unit contain one meta carboranylene radical and one para carboranylene radical. The polymers are useful as high energy fuels when compounded with oxidizers.

---

This invention relates to polymers in which m- or p-carborane nuclei are connected via sulfur atoms. It also relates to polymers in which both m- and p-carborane moieties are linked alternately through sulfur bridges. More particularly, this invention relates to novel carboranylene sulfide polymers prepared by reacting a bis(halosulfenyl)-m- or p-carborane with the dilithio salt of m- or p-carborane in the presence of an inert solvent. The invention herein described was made in the course of or under a contract or subcontract thereunder with the Department of the Navy.

The novel polymers of this invention have (I) recurring units of the formula:

$$\{M-S\}$$

wherein M represents the meta carboranylene radical or the para carboranylene radical or (II) recurring units of the formula:

$$\{M-S-M'-S\}$$

where M and M' are independently selected from the group consisting of the meta carboranylene or para carboranylene radical and with the proviso that each recurring unit contain one meta carboranylene radical and one para carboranylene radical. The molecular weight of the polymers of this invention may vary from about 400 to about 10,000 or more.

The novel poly-m- and p-carboranylenesulfides of this invention are prepared by reacting, for example, 1,7-bis-(chlorosulfenyl)-m-carborane with the dilithio salt of m-carborane in an inert solvent. The reaction by which the polymers of this invention are prepared proceeds as shown in the following equation where for purposes of illustration the reaction between 1,12-bis(chlorosulfenyl)-p-carborane with the dilithio salt of p-carborane is set forth:

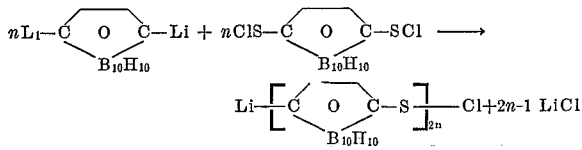

A polymer having recurring units containing both the meta carboranylene radical and the para carboranylene radical can be prepared, for example, by reacting 1,12-bis(chlorosulfenyl)-p-carborane with the dilithio salt of m-carborane in an inert solvent. Generally, the reaction is carried out at temperatures ranging from about −30° to about +25° C. or more depending upon the particular reaction conditions employed. Preferably, the reaction is conducted in the temperature range of from about −10° to about +20° C.

A wide variety of inert solvents can be employed in conducting this novel reaction. Useful solvents include, for example, diethyl ether, hexane, heptane, pentane, benzene and tetrahydrofuran.

The polymers can be recovered from the reaction mixture by a number of methods well known in the art. For example, the reaction mixture containing the polymer product can be hydrolyzed with aqueous hydrochloric acid whereby the polymer is precipitated and the precipitate recovered by filtration, decantation, centrifugation, etc. During the hydrolysis reaction a part or all the end groups may be replaced by hydroxyl groups.

Although the reaction is conveniently carried out at atmospheric pressure, subatmosphere pressures as well as pressures of up to about +5 atmospheres can be employed.

Depending upon the particular reaction conditions employed, the time of reaction will vary widely although usually it will be from about 0.1 to about 10 hours. For high yields of the polymeric products it is necessary to employ nearly stoichiometric quantities of the two reactants.

The term "carborane" is a generic term used to describe all three isomers of dicarbaclosododecaborane having the empirical formula:

$$B_{10}C_2H_{12}$$

The ortho isomer of carborane, i.e., 1,2-dicarbaclosododecaborane or o-carborane is represented by the following formula:

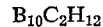

The term ortho carboranylene is applied to the radical derived from o-carborane having the formula:

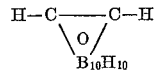

1,7-dicarbaclosododecaborane or m-carborane is represented by the formula:

$$H-CB_{10}H_{10}C-H$$

and the m-carboranylene radical is likewise shown by:

$$-CB_{10}H_{10}C-$$

Finally, the para isomer of carborane or 1,12-dicarbaclosododecaborane is represented by the formula:

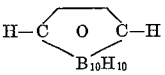

and the corresponding carboranylene radical; i.e., p-carboranylene has the formula:

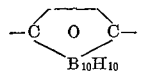

All three isomers are conveniently accessible by well established synthetic procedures. o-Carborane is best prepared from the reaction of decaborane with a Lewis base and acetylene in an ether solvent (Inorg. Syntheses, vol. X). m-Carborane is readily obtained by a thermoisomerization flow process from the ortho isomer at temperatures above 475° C. (I and EC Prod. Res. and Dev., 5, 334 (1966)). The same apparatus is used to convert o-carborane, m-carborane, or a mixture thereof to the para isomer at temperatures between 630° and 750° C.

The reaction by which the bis(chlorosulfenyl)-carboranes utilized as starting materials in the process of this invention are prepared in shown below, where for purposes of illustration the preparation of 1,7-bis(chlorosulfenyl)-m-carborane is shown:

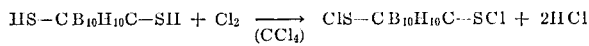

The above-mentioned bis(chlorosulfenyl) carboranes can be conveniently prepared by the process set forth completely in application S.N. 726,195, filed May 2, 1968 in the names of Hansjuergen A. Schroeder and Nick S. Semenuk. For example, the compound 1,7-bis(chlorosulfenyl)-m-carborane can be prepared as follows:

A solution of 10.42 g. (0.05 mole) 1,7-bismercapto-m-carborane in 100 ml. of carbon tetrachloride is cooled to −20° C. and stirred mechanically under a nitrogen blanket. To this solution, maintained at −20 to −15° C., there is added over a one-hour period, a solution of 7.80 g. (0.11 mole) of chlorine in 100 ml. of carbon tetrachloride. The resulting solution is allowed to warm slowly to room temperature and then permitted to stand at room temperature under nitrogen overnight. Evaporation of the carbon tetrachloride solution yields an orange-yellow residue (14.3 g.) which is vacuum distilled to yield (66 percent of theoretical) 1,7-bis (chlorosulfenyl)-m-carborane having the formula:

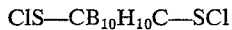

B.P. 92–93° C./0.15 mm.; $n_D^{25}$ 1.6173.

Useful bis(halosulfenyl)-carborane derivatives which can be employed as starting materials in the process of this invention include, for example, 1,7-bis(chlorosulfenyl)-m-carborane, 1,12-bis(chlorosulfenyl)-p-carborane and the corresponding bromine and iodine derivatives.

The dilithio m- and p-carborane salts which are useful as starting materials in the process of this invention can be prepared by the process described in U.S. Pat. 3,148,219. For example, C,C'-dilithio-m-carborane (i.e., Li—CB$_{10}$H$_{10}$C—Li) can be formed by reacting m-carborane with n-butyl lithium in the presence of dialkyl ether. The corresponding p-carborane derivative can be formed in the same manner.

The solid poly-m- and p-carborane products of this invention when incorporated with suitable oxidizers such as ammonium perchlorate, potassium perchlorate, sodium perchlorate and the like in an amount equal to about 15–25 percent by weight of the carborane derivatives yield solid propellants suitable for rocket power plants. These propellants burn with high flame speeds, have high heats of combustion and are of the high specific impulse type. In addition to the oxidizer and oxidizable material the propellant composition may also contain an artificial resin, such as a partially condensed ureaformaldehyde or phenol formaldehyde resin in an amount of about 5 to about 10 percent by weight of the oxidizer and the boron compound. The ingredients can be mixed with simultaneous removal of solvent after which the solvent-free mixture can be molded into any desired shape as by extrusion. Curing of the resin can then be accomplished by heating at moderate temperatures.

The following examples illustrate various embodiments of this invention and are to be considered not limitative.

EXAMPLE I

Poly-m-carboranylenesulfide

The dilithio salt of m-carborane (i.e.,

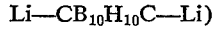

was prepared by the addition of a solution of 3.61 g. (0.025 mole) m-carborane in 100 ml. diethyl ether to a hexane solution of n-butyl lithium (35 ml., 0.055 mole, of a 1.6 M solution). The salt was isolated by inverse filtration and suspended in 100 ml. diethyl ether. Under a nitrogen sweep, with good mechanical stirring, a solution of bis(chlorosulfenyl)-m-carborane (6.93 g., 0.025 mole) (i.e., ClS—CB$_{10}$H$_{10}$C—SCl) in 50 ml. diethyl ether was added to the dilithio salt slurry. The temperature was maintained at less than 10° C. and immediate discoloration and new precipitation ensued. After stirring at less than 10° C. for 2 hours and 25–30° C. for 1 hour, the suspension was cooled, and hydrolyzed with 5 g. of concentrated HCl in 100 ml. cold water. The suspension was filtered, the precipitate washed with water (200 ml.) and ether (200 ml.) and then dried in vacuo. Recrystallization of the residue (3.4 g.) from benzene yielded 1.4 g. of white polymeric product, M.P. 181–183°, M.W. (osm.) found: 1051, consisting esesntially of recurring units of the formula:

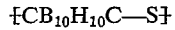

*Analysis.*—Calc'd for $(C_2H_{10}B_{10}S)_x$ (percent): C, 13.81; H, 5.75; B, 61.10; S, 18.40. Found (percent): C, 13.54; H, 5.60; B, 57.77; S, 17.7.

EXAMPLE II

Poly-m-carboranylenesulfide

The dilithio salt of m-carborane (i.e.,

was prepared under nitrogen by the addition of a solution of 14.4 g. (0.1 mole) m-carborane in 400 ml. diethyl ether to a hexane solution of n-butyl lithium (140 ml., 0.221 mole of 1.6 M solution). An additional 400 ml. hexane was added, and the salt isolated by inverse filtration and then suspended in 400 ml. diethyl ether. To the well-stirred suspension there was added a solution of 25 g. (0.09 mole) of bis(cholrosulfenyl)-m-carborane in 200 ml. diethyl ether. The addition time was 15 minutes, and the temperature was maintained below 10° C. After stirring at 23–30° for 60 minutes, the white suspension was cooled and hydrolyzed with aqueous HCl. The suspension was filtered, the precipitate washed with water and diethyl ether and dried in vacuo to yield 16.4 g. (53 percent of theoretical) of crude polymer. A portion of this polymer was recrystallized from o-xylene to yield a white product (M.P. 219–222°) of M.W. (osm.) 5391, consisting essentially of recurring units of the formula:

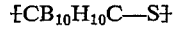

*Analysis.*—Calc'd for $(C_2H_{10}B_{10}S)_x$ (percent): C, 13.81; H, 5.75; B, 62.10; S, 18.40. Found (percent): C, 13.54; H, 5.60; B, 57.81; S, 17.7.

EXAMPLE III

Poly-p-carboranylenesulfide

To a slurry of 0.05 mole (from 7.2 g. p-carborane) of the dilithio salt of para carborane in 200 ml. diethyl ether, maintained at 10° under nitrogen, was added a solution of bis (chlorosulfenyl)-p-carborane (12.5 g., 0.045 mole) in 200 ml. diethyl ether. Following the procedure used in the meta series, a colorless polymeric precipitate (7.5 g.) was isolated which had the expected IR spectrum for a polysulfide terminated by a hydroxy group. The polymer was high melting (420° C.) and could not be rigorously purified because lack of solubility; impurities were extracted with refluxing o-xylene.

The polymeric product of this example consisted essentially of recurring units of the formula:

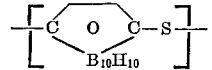

*Analysis.*—Calc'd for $(C_2H_{10}B_{10}S)_x$ (percent): C, 13.81; H, 5.75; B, 62.10; S, 18.40. Found (percent): C, 12.98; H, 5.52; B, 60.32; S, 20.3.

EXAMPLE IV

Poly(m- and p-carboranylene)sulfide

A solution of m-$B_{10}H_{10}C_2(SCl)_2$ (13.9 g., 0.05 mole) in ether (125 ml.) was added over 30 minutes to a slurry of 0.053 mole (from 7.58 g. p-carborane) of the dilithio salt of p-carborane in ether (100 ml.) while maintaining the temperature below 10° C. After stirring the mixture at 23–30° C. for 2.5 hours, the resulting white suspension was cooled and hydrolyzed with dilute hydrochloric acid. The insoluble product recovered by filtration was washed with water and then ether, and finally dried in vacuo to yield 4.6 g. (27 percent of theoretical) crude polymeric product; melting point (after recrystallization from o-xylene): 206–208° C. and having recurring units of the formula:

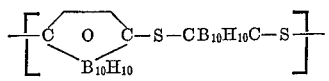

*Analysis.*—Calc'd for $(C_4H_{20}B_{20}S_2)_x$ (percent): C, 13.78; H, 5.74; B, 62.10; S, 18.41. Found (percent): C, 13.61; H, 5.84; B, 58.36; S, 17.91. Mol. wt. (by osmometry): 2267.

The boron-containing solid poly-m- and p-carboranylenesulfide produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, ammonium nitrate and the like. In formulating a solid propellant composition employing one of the materials produced in accordance with the present invention, generally from 10 to 35 parts by weight of the boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided boron-containing material can be admixed with a high solids content solution of partially condensed urea-formaldehyde or phenol-formaldehyde resin, the proportions being such that the amount of resin is about 5 to 10 percent by weight of oxidizer and polycarboranylene sulfide polymer. The ingredients can be thoroughly mixed with simultaneous removal of solvent, and following this the solvent-free mixture can be molded into the desired shape as by extrusion. Thereafter, the resin can be cured by resorting to heating at moderate temperatures. For further information concerning the formulation of solid propellant compositions, reference is made to U.S. Pat. 2,622,277 to Bonnell and to U.S. Pat. 2,646,596 to Thomas.

What is claimed is:

1. A polymer consisting essentially of recurring structural units selected from the group consisting of the Formula A:

where M is selected from the group consisting of the meta carboranylene radical and the para carboranylene radical; and of the Formula B:

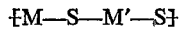

wherein M and M' are independently selected from the group consisting of the meta carboranylene radical and the para carboranylene radical and with the proviso that each recurring unit contain one meta carboranylene radical and one para carboranylene radical.

2. A polymer of claim 1 consisting essentially of recurring units of the formula:

wherein M is the meta carboranylene radical.

3. A polymer of claim 1 consisting essentially of recurring units of the formula:

wherein M is the para carboranylene radical.

4. A polymer of claim 1 consisting essentially of recurring units of the formula:

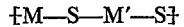

wherein M is the para carboranylene radical and M' is the meta carboranylene radical.

5. A method for preparing a polymer which comprises reacting a compound of the formula:

wherein X is a halogen selected from the group consisting of chlorine, bromine and iodine and M is selected from the group consisting of the meta carboranylene radical and the para carboranylene radical, with a material of the formula:

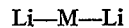

wherein M is selected from the group consisting of the meta carboranylene radical and the para carboranylene radical, the said reaction being conducted in the presence of an inert solvent.

6. The method of claim 5 wherein the said compound is:

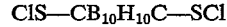

7. The method of claim 5 wherein the said compound is:

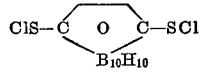

8. The method of claim 5 wherein the said material is:

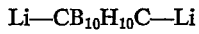

9. The method of claim 5 wherein the said material is:

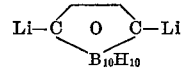

10. The method of claim 5 wherein the said reaction is conducted in the presence of diethyl ether.

11. The method of claim 5 wherein the said compound is:

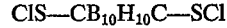

and the said material is:

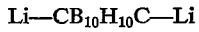

12. The method of claim 5 wherein the said compound is:

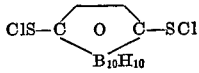

and the said material is:

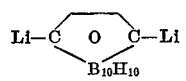

13. The method of claim 5 wherein the said compound is:
ClS—CB$_{10}$H$_{10}$C—SCl
and the said material is:
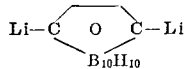
References Cited
UNITED STATES PATENTS
2,822,351  2/1958  Kreuchunas _____ 260—79.3
3,432,468  3/1969  Gabler _____ 260—47
DONALD E. CZAJA, Primary Examiner
M. I. MARQUIS, Assistant Examiner
U.S. Cl. X.R.
149—76, 77; 260—79, 606.5, 609, 838, 849